(12) United States Patent
Zhang et al.

(10) Patent No.: US 10,333,321 B2
(45) Date of Patent: Jun. 25, 2019

(54) OVERVOLTAGE AND OVERCURRENT PROTECTION CIRCUIT AND MOBILE TERMINAL

(71) Applicant: GUANG DONG OPPO MOBILE TELECOMMUNICATIONS CORP., LTD., Dongguan (CN)

(72) Inventors: Jialiang Zhang, Dongguan (CN); Wenqiang Cheng, Dongguan (CN); Dashuai Huang, Dongguan (CN); Yuanxiang Hu, Dongguan (CN); Kewei Wu, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/607,731

(22) Filed: May 30, 2017

(65) Prior Publication Data
US 2017/0264114 A1 Sep. 14, 2017

Related U.S. Application Data

(63) Continuation of application No. 15/114,207, filed as application No. PCT/CN2014/078366 on May 26, 2014.

(30) Foreign Application Priority Data

Jan. 28, 2014 (CN) .......................... 2014 1 0043226

(51) Int. Cl.
*H01M 2/34* (2006.01)
*H02H 3/20* (2006.01)
(Continued)

(52) U.S. Cl.
CPC ............. *H02J 7/0029* (2013.01); *H01M 2/34* (2013.01); *H01M 10/44* (2013.01);
(Continued)

(58) Field of Classification Search
CPC .................................. H02J 7/00; H02J 7/0029
(Continued)

(56) References Cited

U.S. PATENT DOCUMENTS 6,331,763 B1 12/2001 Thomas et al.
2006/0268645 A1* 11/2006 Graf ..................... H01H 37/761
365/225.7

(Continued)

FOREIGN PATENT DOCUMENTS

CN 1199935 A 11/1998
CN 101202462 A 6/2008
(Continued)

OTHER PUBLICATIONS

"Battery Protection IC for 1-Serial to 4-Serial-Cell Pack", http://datasheet.sii-ic.com/en/battery_protection/S8244_E.pdf, Mar. 11, 2007.*
(Continued)

*Primary Examiner* — Drew A Dunn
*Assistant Examiner* — Harry O'Neill-Becerril
(74) *Attorney, Agent, or Firm* — Hodgson Russ LLP

(57) ABSTRACT

The present disclosure provides an overvoltage and overcurrent protection circuit and a mobile terminal. The overvoltage and overcurrent protection circuit comprises a primary protection circuit and a secondary protection circuit. The primary protection circuit comprises a power end coupled to an anode of a cell, a detection end coupled to a cathode of the cell, and a low potential interface end coupled to a ground end of a charging and discharging interface. The secondary protection circuit comprises a high potential cell end, a low potential cell end, and a high potential interface
(Continued)

end, in which the high potential cell end is externally coupled to the anode of the cell, the low potential cell end is externally coupled to the cathode of the cell, and the high potential interface end is externally coupled to a power end of the charging and discharging interface.

18 Claims, 3 Drawing Sheets

(51) Int. Cl.
  *H02H 7/18* (2006.01)
  *H02J 7/00* (2006.01)
  *H01H 85/02* (2006.01)
  *H01M 10/44* (2006.01)
  *H02H 3/087* (2006.01)

(52) U.S. Cl.
  CPC .......... *H01M 10/448* (2013.01); *H02H 7/18* (2013.01); *H02J 7/007* (2013.01); *H02J 7/0068* (2013.01); *H01H 2085/025* (2013.01); *H01H 2085/0283* (2013.01); *H01M 2200/00* (2013.01); *H01M 2200/103* (2013.01); *H01M 2220/30* (2013.01); *H02H 3/087* (2013.01); *H02H 3/202* (2013.01); *H02J 2007/004* (2013.01); *H02J 2007/0037* (2013.01); *H02J 2007/0039* (2013.01); *H02J 2007/0095* (2013.01)

(58) Field of Classification Search
  USPC ........................................... 320/134
  See application file for complete search history.

(56) References Cited

U.S. PATENT DOCUMENTS

| | | | |
|---|---|---|---|
| 2007/0096695 A1 | 5/2007 | Kimura et al. | |
| 2008/0238370 A1* | 10/2008 | Carrier | H01M 2/1022 320/134 |
| 2009/0085519 A1* | 4/2009 | Kim | H02J 7/0011 320/134 |
| 2009/0202890 A1* | 8/2009 | Takeda | H01M 2/34 429/62 |
| 2011/0003179 A1 | 1/2011 | Jang | |
| 2011/0273804 A1* | 11/2011 | Ikeuchi | H02J 7/0031 361/63 |
| 2012/0139494 A1 | 6/2012 | Kim | |
| 2012/0187897 A1 | 7/2012 | Lenk et al. | |
| 2012/0300351 A1 | 11/2012 | Ikeuchi et al. | |
| 2013/0285616 A1* | 10/2013 | Washiro | H01M 10/44 320/134 |
| 2015/0187709 A1* | 7/2015 | Lee | H01L 21/0217 257/529 |

FOREIGN PATENT DOCUMENTS

| | | |
|---|---|---|
| CN | 201893551 U | 7/2011 |
| CN | 102611163 A | 7/2012 |
| CN | 202797874 U | 3/2013 |
| CN | 203243071 U | 10/2013 |
| CN | 203747455 U | 7/2014 |
| JP | 2007288952 A | 11/2007 |
| JP | 2008182626 A | 8/2008 |
| JP | 2010259240 A | 11/2010 |
| JP | 2011-114934 A | 6/2011 |
| KR | 20050026360 A | 3/2005 |
| KR | 20060028174 A | 3/2006 |
| KR | 20070105219 A | 10/2007 |
| KR | 20100005371 A | 1/2010 |
| KR | 20110081250 A | 7/2011 |

OTHER PUBLICATIONS

"Understanding USB 3.1 Type-C", http://www.comprehensivecable.com/content/icontact/Alotmorethancables/USB31-TypeC.html, Jul. 31, 2013.*

"ROHM's USB Type-C Power Delivery Controller ICs", http://www.rohm.de/web/de/news-detail?news-title=2015-09-15-rohm%E2%80%99s-usb-type-c-power-delivery-controller-ics&defaultGroupId=false.*

ISA/CN, International Search Report for PCT/CN2014/078366, dated Nov. 6, 2014.

ISA/CN, Written Opinion of the International Searching Authority for PCT/CN2014/078366, dated Nov. 6, 2014.

EPO, Office Action for EP Application No. 14880628 dated Oct. 11, 2017.

JPO, Office Action for JP Application No. 2016-549516 dated Oct. 3, 2017.

KIPO, Office Action for KR Application No. 10-2016-7022408 dated Aug. 29, 2017.

USPTO, OA for U.S. Appl. No. 15/114,207 (Feb. 25, 2019).

\* cited by examiner

OVERVOLTAGE AND OVERCURRENT PROTECTION CIRCUIT AND MOBILE TERMINAL

CROSS REFERENCE

This application is a continuation of U.S. national phase application Ser. No. 15/114,207, filed Jul. 26, 2016, which is based on International Application No. PCT/CN2014/078366, filed May 26, 2014, and claims priority to Chinese Patent Application No. 201410043226.X, titled "overvoltage and overcurrent protection circuit and mobile terminal", filed Jan. 28, 2014, the entire contents of which are incorporated herein by reference.

TECHNICAL FIELD

This disclosure relates to power supply field, and particularly relates to an overvoltage and overcurrent protection circuit and a mobile terminal.

BACKGROUND

With the progress of the times, internet and mobile communication network provide a large amount of functional applications. A user can not only use a mobile terminal to perform a traditional application such as answering or calling using a smart phone, but also can use a mobile terminal to surf on a webpage, transmit pictures and play a game etc.

Since the using frequency of the mobile terminal is increasing, the mobile terminal needs to be charged frequently. In order to avoid security accidents caused by abnormal charging, a large amount of primary protection circuits are provided to prevent an over-charging and an over-discharging. However, if the over-charging or the over-discharging occurs, an existing primary protection circuit (including an over-charging and over-discharging protection circuit) switches off a charging loop or a discharging loop via a MOS transistor. Once the MOS transistor is broken down or damaged, the primary protection circuit will lose a protection function of preventing the over-charging and the over-discharging, thus causing electronic elements of the primary protection circuit being damaged, and causing other circuits inside the mobile terminal being damaged, and even causing a fire.

SUMMARY

An objective of this disclosure is to provide an overvoltage and overcurrent protection circuit using a fuse to perform a secondary protection and a mobile terminal, so as to solve a problem in the related art that the primary protection circuit uses a MOS transistor to control switching on or off, and once the MOS transistor is damaged, the protection function of preventing an over-charging and an over-discharging is lost.

In an aspect, an overvoltage and overcurrent protection circuit is provided in the present disclosure. The overvoltage and overcurrent protection circuit includes a primary protection circuit and a secondary protection circuit.

The primary protection circuit includes a power end, a detection end, and a low potential interface end. The power end is coupled to an anode of a cell, the detection end is coupled to a cathode of a cell, and the low potential interface end is coupled to a ground end of a charging and discharging interface. The primary protection circuit is configured to detect whether there is an over-charging when the cell is charged, and to switch off charging the cell via the charging and discharging interface if there is the over-charging; the primary protection circuit is further configured to detect whether there is an over-discharging when the cell is discharging, and to switch off discharging of the cell via the charging and discharging interface if there is the over-discharging.

The secondary protection circuit includes a high potential cell end, a low potential cell end, and a high potential interface end. The high potential cell end is externally coupled to the anode of the cell, the low potential cell end is externally coupled to the cathode of the cell, and the high potential interface end is externally coupled to a power end of the charging and discharging interface. The secondary protection circuit is configured to perform an overvoltage protection and an overcurrent protection via a fuse when the cell is charged via the charging and discharging interface.

The secondary protection circuit includes a voltage detection chip, a switch circuit and a limit-voltage and limit-current fuse chip. The voltage detection chip detects a charging voltage for charging the cell in real time. When the charging voltage is too large, the voltage detection chip outputs a control signal for controlling the switch circuit to switch on, such that an overvoltage current is formed on a fuse between an output pin and a limit-voltage pin of the limit-voltage and limit-current fuse chip and the fuse is melted.

When the charging current is too large, a fuse between an input pin and the output pin of the limit-voltage and limit-current fuse chip is also melted.

In an aspect, a mobile terminal is provided in the present disclosure. The mobile terminal includes a cell and a charging and discharging interface, and further includes the above-described overvoltage and overcurrent protection circuit.

BRIEF DESCRIPTION OF THE DRAWINGS

To describe the technical solutions in embodiments of the present invention more clearly, the accompanying drawings required for describing the embodiments or the prior art are introduced briefly in the following. Obviously, the accompanying drawings in the following description are only some embodiments of the present invention, and persons of ordinary skill in the art may also derive other drawings from these accompanying drawings without creative efforts.

DETAILED DESCRIPTION

In order to make the objectives, the technical solutions and the advantages of the present disclosure more clear, further explanations on this disclosure are given below in details with reference to figures and exemplary embodiments. It is to be understood that, the exemplary embodiments described herein are merely used to explain the disclosure, rather than to limit this disclosure. Specific embodiments are applied to facilitate describing the technical solutions of the present disclosure.

In embodiments of the present disclosure, a mobile terminal includes a cell and a charging and discharging interface, and further includes an overvoltage and overcurrent protection circuit. When the cell needs to be charged, an electric signal is inputted from the charging and discharging interface and the cell is charged via the overvoltage and overcurrent protection circuit. In addition, when the cell supplies power to the mobile terminal via a high potential interface end of a secondary protection circuit 1 and a low potential interface end of a primary protection circuit 2, an over-discharging protection is performed via the primary protection circuit 2. In this way, either for a charging of the cell or a discharging of the cell, an overvoltage and overcurrent protection can be realized.

Figure 1:
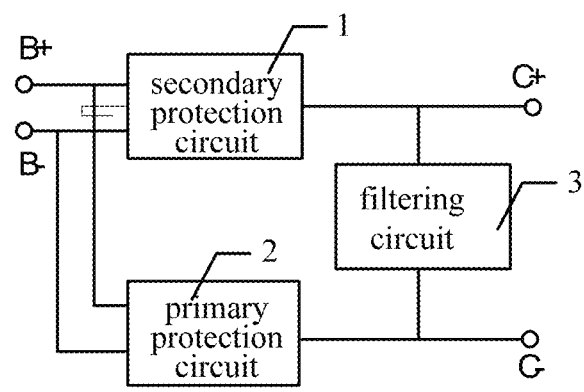
FIG. 1 shows a schematic diagram of an overvoltage and overcurrent protection circuit provided by an embodiment of this disclosure.

FIG. 1 shows a structure of an overvoltage and overcurrent protection circuit provided in an embodiment of the present disclosure. For description, only parts related to the embodiment of this disclosure are shown, which will be detailed as follows.

The overvoltage and overcurrent protection circuit includes the primary protection circuit 2 and the secondary protection circuit 1.

The primary protection circuit 2 includes a power end, a detection end, and a low potential interface end. The power end is coupled to an anode of the cell, the detection end is coupled to a cathode of the cell, and the low potential interface end is coupled to a ground end of the charging and discharging interface. The primary protection circuit 2 is configured to detect whether there is an over-charging when the cell is charged, and to switch off charging the cell via the charging and discharging interface if there is the over-charging, and the primary protection circuit 2 is further configured to detect whether there is an over-discharging when the cell is discharging, and to switch off the discharging of the cell via the charging and discharging interface if there is the over-discharging.

The secondary protection circuit 1 includes a high potential cell end, a low potential cell end, and a high potential interface end. The high potential cell end is externally coupled to the anode of the cell, the low potential cell end is externally coupled to the cathode of the cell, and the high potential interface end is externally coupled to a power end of the charging and discharging interface. The secondary protection circuit 1 is configured to perform an overvoltage protection and an overcurrent protection via a fuse when the cell is charged via the charging and discharging interface.

The anode and the cathode of the cell are respectively represented as node B+ and node B−.

The high potential interface end of the secondary protection circuit 1 is represented as node C+. Meanwhile, the low potential interface end of the primary protection circuit 2 is represented as node C−. The mobile terminal can be powered via node C+ and node C−.

In at least one embodiment, when the cell is charged, the primary protection circuit 2 detects a charging voltage for charging the cell in real time via the power end and the ground end thereof. If the charging voltage is too large, the primary protection circuit 2 switches off a charging loop for charging the cell via the charging and discharging interface. In addition, once the cell is fully charged, the primary protection circuit 2 switches off the charging loop for charging the cell via the charging and discharging interface, so as to stop charging the cell, thus avoiding an over-charging for cell. In addition, the primary protection circuit 2 further detects a charging current in real time, and if the charging current is too large, the charging loop for charging the cell is switched off. Since the primary protection circuit 2 uses a MOS transistor to control the charging loop to switch on or off, the charging loop cannot be switched off if the MOS transistor is damaged (for example, broken down). Thus, the secondary protection circuit 1 is added in embodiments of the present embodiment. While the primary protection circuit 2 detects the voltage between the anode and the cathode of the cell in real time, the secondary protection circuit 1 also detects the voltage between the anode and the cathode of the cell (i.e. the charging voltage for charging the cell) in real time and detects the charging current for charging the cell in real time. Once the charging voltage for the cell is too large, the cell is fully charged or the charging current is too large, the secondary protection circuit 1 switches off the charging loop by switching off the fuse.

Generally, when the cell supplies power to the mobile terminal (i.e., the cell is discharging) via the high potential interface end of the secondary protection circuit 1 and the low potential interface end of the primary protection circuit 2, neither the secondary protection circuit 1 nor the primary protection circuit 2 will detect that the voltage between the anode and the cathode of the cell is too large, but both the secondary protection circuit 1 and the primary protection circuit 2 provide an overvoltage protection. When the cell is discharging, an operation principle for performing an overvoltage protection by the secondary protection circuit 1 is the same as the operation principle for performing an overvoltage protection by the primary protection circuit 2, which will not be elaborated herein. In addition, in order to avoid the over-discharging of the cell, while the secondary protection circuit 1 performs the overcurrent protection by detecting the charging current of the cell via the fuse in real time, the primary protection circuit 2 detects the charging current of the cell via a resistor in real time, such that when the over-discharging of the cell occurs, the secondary protection circuit 1 switches off a discharging loop of the cell by switching off the fuse, and/or the primary protection circuit 2 switches off the discharging loop of the cell by controlling the MOS transistor.

It should be noted that, the fuse in the secondary protection circuit 1 can be selected according to actual requirements, so as to determine a maximum current that the fuse can support. In addition, it is also determined, at which value of the charging or discharging current and at which value of the voltage between the anode and the cathode of the cell, the primary protection circuit 2 switches off the charging loop or the discharging loop. It is further determined whether the primary protection circuit 2 or the secondary protection circuit 1 is the first one to switch off the charging and discharging loop with the increasing of the current, once the overcurrent of the charging loop or the discharging loop occurs. In other words, it is determined whether the primary protection circuit 2 or the secondary protection circuit 1 is the first one to start the overvoltage and overcurrent protection.

In another embodiment of the present disclosure, the overvoltage and overcurrent protection circuit further includes a filtering circuit 3.

The filtering circuit 3 includes a high potential end and a low potential end. The high potential end is coupled to the low potential interface end of the primary protection circuit 2, and the low potential end is coupled to the high potential interface end of the secondary protection circuit 1. The filtering circuit 3 is configured to perform a low-pass filtering on an electric signal inputted from the charging and discharging interface when the cell is charged via the charging and discharging interface.

In addition, in order to avoid that the primary protection circuit 2 and/or the secondary protection circuit 1 are falsely triggered by a high-frequency noise signal (including a current signal which will trigger the overcurrent protection, or a voltage signal which will trigger the overvoltage protection) inputted from the charging and discharging interface to switch off the charging loop in the charging process, the filtering circuit 3 is introduced to perform the low-pass filtering on the power signal inputted from the charging and discharging interface end, and then the power signal after the low-pass filtering is used to charge the cell.

Figure 2:
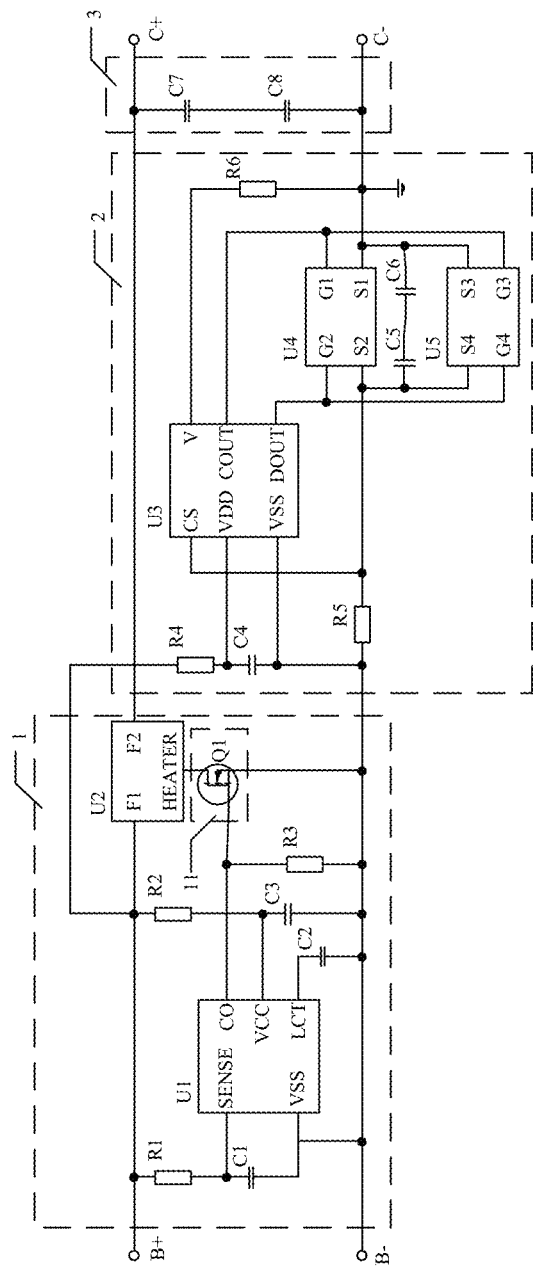
FIG. 2 shows a circuit diagram of an overvoltage and overcurrent protection circuit provided by an embodiment of this disclosure.

FIG. 2 shows a specific circuit of the overvoltage and overcurrent protection circuit provided by an embodiment of the present disclosure. For description, only parts related to embodiments of this disclosure are shown, which will be detailed as follows.

In an embodiment of the present disclosure, the secondary protection circuit 1 includes a first resistor R1, a first capacitor C1, a second resistor R2, a second capacitor C2, a third resistor R3, a third capacitor C3, a voltage detection chip U1, a limit-voltage and limit-current fuse chip U2 and a switch circuit 11.

A first terminal of the first resistor R1, a second terminal of third resistor R3 and a second fuse pin F2 of the limit-voltage and limit-current fuse chip U2 are respectively configured as the high potential cell end, the low potential cell end and the high potential interface end of the secondary protection circuit 1. A positive voltage detection pin SENSE, a negative voltage pin VSS, a control output pin C0, a power pin VCC and a delay pin LCT of the voltage detection chip U1 are respectively coupled to a second terminal of the first resistor R1, a first terminal of the first capacitor C1, a second terminal of the third resistor R3, a controlled terminal of the switch circuit 11, a first terminal of the third capacitor C3 and a first terminal of the second capacitor C2. Each of a second terminal of the first capacitor C1, a second terminal of the third capacitor C3 and a second terminal of the second capacitor C2 is coupled to a second terminal of the third resistor R3. A first terminal of the second resistor R2 and a second terminal of the second resistor R2 are respectively coupled to a first fuse pin F1 of the limit-voltage and limit-current fuse chip U2 and a first terminal of the third capacitor C3. A first terminal of the third resistor R3 is coupled to a control end of the switch circuit 11. A high potential end of the switch circuit 11 and a low potential end of the switch circuit 11 are respectively coupled to a limit-voltage pin HEATER of the limit-voltage and limit-current fuse chip U2 and a second terminal of the third resistor R3.

It should be noted that, there are two fuses and one resistor inside the limit-voltage and limit-current fuse chip U2, in which, the two fuses are coupled in series and coupled between the first fuse pin F1 and the second fuse pin F2 of the limit-voltage and limit-current fuse chip U2. The resistor is coupled between a junction of the two fuses and the limit-voltage pin HEATER, i.e., one fuse and the resistor are coupled in series between the first fuse pin F1 and the limit-voltage pin HEATER, and the other fuse and the resistor are coupled in series between the second fuse pin F2 and the limit-voltage pin HEATER.

In this way, during charging the cell, the voltage detection chip U1 detects the charging voltage for charging the cell in real time via the positive voltage detection pin SENSE and the negative voltage pin VSS. Once the charging voltage is too large, a control signal is outputted from the control output pin C0, and the switch circuit 11 is controlled to switch on via the control signal. If the charging voltage is too large, an overvoltage current is formed on the fuse between the second fuse pin F2 and the limit-voltage pin HEATER of the limit-voltage and limit-current fuse chip U2 and melts the fuse, such that after one of the two fuses is fused, the charging loop is switched off, and the charging for the electric core is stopped.

In addition, when the cell is charged via the charging and discharging interface, the two fuses between the first fuse pin F1 and the second fuse pin F2 of the limit-voltage and limit-current fuse chip U2 will both be melted if the charging current is too large, and thus the charging loop is directly switched off.

In this way, if the primary protection circuit 2 fails, i.e., loses the overvoltage and overcurrent protection function, the overvoltage and overcurrent protection may be realized via the fuse inside the limit-voltage and limit-current fuse chip U2.

In addition, if the over-discharging of the cell occurs, the two fuses between the first fuse pin F1 and the second fuse pin F2 of the limit-voltage and limit-current fuse chip U2 will both be melted, and thus the charging loop is directly switched off, and supplying power to the mobile terminal via the charging and discharging interface is stopped.

Usually, an overvoltage problem will not exist when the cell is discharging, and if the overvoltage problem exists when the cell is discharging, the overvoltage protection can be realized via the fuse between the first fuse pin F1 and the limit-voltage pin HEATER of the limit-voltage and limit-current fuse chip U2. The operation principle is similar to the function of realizing the overvoltage protection via the second fuse pin F2 and the limit-voltage pin HEATER of the limit-voltage and limit-current fuse chip U2, which will not be elaborated herein. In at least one embodiment, a model of the limit-voltage and limit-current fuse chip U2 is SFJ-0412.

In at least one embodiment, according to a control requirement for the switch circuit 11, the control signal outputted from the control output pin C0 of the voltage detection chip U1 may be a high potential signal or a low potential signal. Thus, the switch circuit 11 may be formed of a NMOS transistor or a PMOS transistor. For example, if the control signal is the low potential signal, the switch circuit 11 can be realized by choosing the PMOS transistor.

In at least one embodiment of the present disclosure, the voltage detection chip U1 chooses S8244_C. Thus, if the charging voltage is too large, the control output pin CO of the voltage detection chip U1 outputs a high level signal.

In at least one embodiment, the switch circuit 11 includes a NMOS transistor. A drain electrode, a gate electrode and a source electrode of the NMOS transistor are respectively configured as the high potential end, the controlled end and the low potential end of the switch circuit 11.

In this way, if the control signal outputted from the control output pin C0 of the voltage detection chip U1 during the over-charging or over-discharging is the high potential signal, the switch circuit 11 may choose the NMOS transistor. According to actual operation requirements, the NMOS transistor is chosen according to the maximum current that the NMOS transistor may support.

In an embodiment of the present disclosure, the primary protection circuit includes a fourth resistor R4, a fifth resistor R5, a sixth resistor R6, a fourth capacitor C4, a fifth capacitor C5, a sixth capacitor C6, an over-charging and over-discharging detecting chip U3, a third switch chip U4 and a fourth switch chip U5.

A first terminal of the fourth resistor R4, a first terminal of the fifth resistor R5 and a second terminal of the sixth resistor R6 are respectively configured as the power end, the detection end and the low potential interface end of the primary protection circuit 1. A current detection pin CS, a power pin VDD, a ground pin VSS, a low potential pin V, an over-charging pin COUT and an over-discharging pin DOUT of the over-charging and over-discharging detecting chip U3 are respectively coupled to a second terminal of the fourth resistor R4, a first terminal of the fourth capacitor C4, a first terminal of the fifth resistor R5, a first terminal of the sixth resistor R6, a first gate pin G1 of the third switch chip U4 and a second gate pin G2 of the third switch chip U4. A second terminal of the fourth capacitor C4 is coupled to a first terminal of the fifth resistor R5. A first source pin S1 and a second source pin S2 of the third switch chip U4 are respectively grounded and coupled to a second terminal of the fifth resistor R5. A third gate pin G3, a fourth gate pin G4, a third source pin S3, and a fourth source pin S4 of the fourth switch chip U5 are respectively coupled to the first gate pin G1, the second gate pin G2, the first source pin S1, and the second source pin S2 of the third switch chip U4. The fifth capacitor C5 and the sixth capacitor C6 coupled in series are coupled between the first source pin S1 of the third switch chip U4 and the second source pin S2 of the third switch chip U4. A second terminal of the sixth resistor R6 is grounded.

In this way, if the charging current for charging the cell is too large, the over-charging and over-discharging detecting chip U3 detects a large negative voltage via the current detection pin CS and the ground pin VSS thereof, such that the over-charging and over-discharging detecting chip U3 outputs the control signal from the over-charging pin COUT and controls the third switch chip U4 and the fourth switch chip U5 to switch off the charging loop via the control signal outputted from the over-charging pin COUT. In addition, when the cell is charged, if the over-charging and over-discharging detecting chip U3 detects the charging voltage for the cell is too large via the power pin VDD and the ground pin VSS, the over-charging and over-discharging detecting chip U3 also controls the third switch chip U4 and the fourth switch chip U5 to switch off the charging loop via the control signal outputted from the over-charging pin COUT.

If the discharging current is too large when the cell is discharging, the over-charging and over-discharging detecting chip U3 detects a large positive voltage via the current detection pin CS and the ground pin VSS thereof, such that the over-charging and over-discharging detecting chip U3 outputs the control signal from the over-discharging pin DOUT and controls the third switch chip U4 and the fourth switch chip U5 to switch off the discharging loop via the control signal outputted from the over-discharging pin DOUT. In addition, the overvoltage problem usually does not exist during discharging of the cell, but when the overvoltage exists, and if the over-charging and over-discharging detecting chip U3 detects the charging voltage for the cell is too large via the power pin VDD and the ground pin VSS, the over-charging and over-discharging detecting chip U3 also controls the third switch chip U4 and the fourth switch chip U5 to switch off the charging loop via the control signal outputted from the over-charging pin COUT.

In an embodiment of the present disclosure, the filtering circuit 3 includes a seventh capacitor C7 and an eighth capacitor C8.

A first terminal of the seventh capacitor C7 and a second terminal of the eighth capacitor C8 are respectively configured as the high potential end and the low potential end of the filtering circuit 3, and a second terminal of the seventh capacitor C7 is coupled to a first terminal of the eighth capacitor C8.

In this way, during charging the cell via the charging and discharging interface, the high-frequency noise signal may be filtered out in advance by the filtering circuit 3 formed of the seventh capacitor C7 and the eighth capacitor C8, such that when the cell is charged, it may avoid falsely triggering the primary protection circuit 2 to switch off the charging loop via the MOS transistor, and/or falsely triggering the secondary protection circuit 1 to perform the overvoltage or overcurrent protection via the fuse in the limit-voltage and limit-current fuse chip U2.

In an embodiment of the present disclosure, the charging and discharging interface is a USB interface. In at least one embodiment, the USB interface may be an existing USB interface (e.g. a common USB interface of 5 V). In addition, the USB interface may not be an existing USB interface, and according to the charging current requirement, two methods are used to increase the charging current that the USB interface can support: for a first one, choosing a pin that can support large current so as to support the charging current; for a second one, adding the power pins and the ground pins with the same number on the existing USB interface with equal spacing (the spacing is equal to the spacing between adjacent pins in the existing USB interface), such that the USB interface with the added pins can support large charging current. Of course, the first method and the second method that can increase the maximum charging current supported may be used simultaneously.

In at least one embodiment of the present disclosure, the power end and the ground end of the USB interface can support current which is equal to or less than a preset current threshold.

In at least one embodiment, the preset current threshold is 4 amperes.

Figure 3:
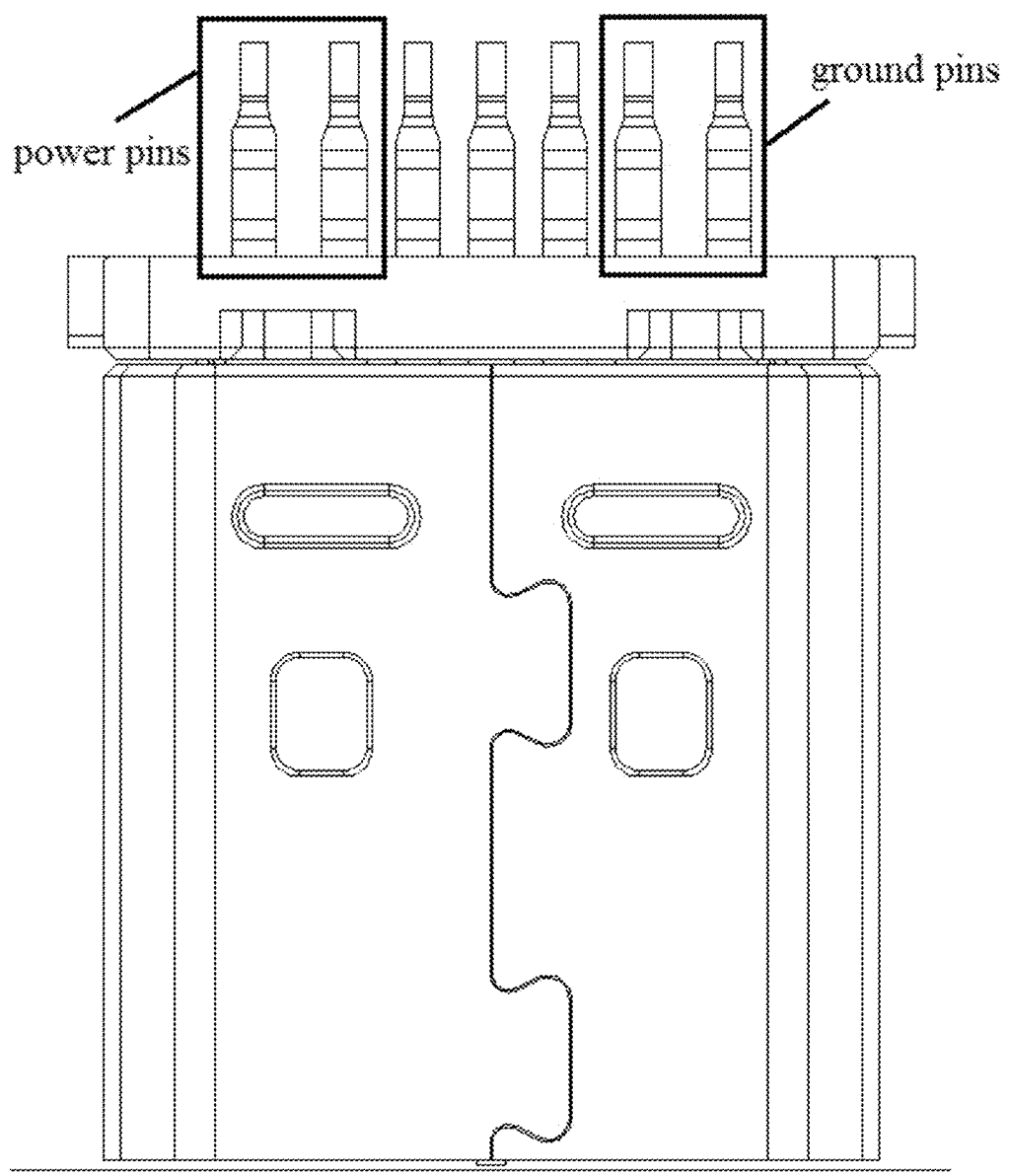
FIG. 3 shows a schematic diagram of a structure of a USB interface provided in embodiments of the present disclosure.

In at least one embodiment, as shown in FIG. 3, the power end of the USB interface includes at least two ground pins, and the ground end of the USB interface includes at least two ground pins. The power signal is transmitted via the power pins, and the ground signal is transmitted via the ground pins.

In at least one embodiment, when there is a need to increase the supportable charging current so as to be compatible with the existing USB interface, one or more power pins and one or more ground pins are added on the existing USB interface with equal spacing, in which, the number of the added power pins are the same with the number of the added ground pins. In addition, the spacing between adjacent pins in the USB interface with added pins is equal to the spacing between adjacent pins in the existing USB interface. Only when a conventional charging is needed for charging the cell, the existing USB interface may be adopted to realize the compatibility with the existing USB interface.

A mobile terminal is further provided in the present disclosure. The mobile terminal includes a cell and a charging and discharging interface, and further includes the above-described overvoltage and overcurrent protection circuit. The overvoltage and overcurrent protection circuit includes a primary protection circuit 2 and a secondary protection circuit 1.

A power end and a detection end of the primary protection circuit 2 are respectively coupled to an anode and a cathode of a cell, and a low potential interface end of the primary protection circuit 2 is connected to a grounding end of a charging and discharging interface.

A high potential cell end and a low potential cell end of the secondary protection circuit 1 are respectively coupled to the anode and the cathode of the cell, and a high potential interface end of the secondary protection circuit 1 is externally coupled to a power end of the charging and discharging interface.

The above descriptions are merely preferred exemplary embodiments of the disclosure, and not intended to limit the scope of the disclosure. Any modifications, equivalent substitutions and improvements made within the spirit and principles of the disclosure shall fall in the protection scope of the disclosure.

What is claimed is:

1. An overvoltage and overcurrent protection circuit, comprising:
   a primary protection circuit, comprising a power end, a detection end, and a low potential interface end, wherein the power end is coupled to an anode of a cell, the detection end is coupled to a cathode of the cell, and the low potential interface end is coupled to a ground end of a charging and discharging interface; the primary protection circuit is configured to detect whether there is an over-charging when the cell is charged, and to switch off charging the cell via the charging and discharging interface if there is the over-charging; the primary protection circuit is further configured to detect whether there is an over-discharging when the cell is discharging, and switch off discharging of the cell via the charging and discharging interface if there is the over-discharging; and
   a secondary protection circuit, comprising a high potential cell end, a low potential cell end, and a high potential interface end, wherein the high potential cell end is externally coupled to the anode of the cell, the low potential cell end is externally coupled to the cathode of the cell, and the high potential interface end is externally coupled to a power end of the charging and discharging interface; the secondary protection circuit is configured to perform an overvoltage protection and an overcurrent protection via a fuse when the cell is charged via the charging and discharging interface,
   wherein the secondary protection circuit comprises a voltage detection chip, a switch circuit and a limit-voltage and limit-current fuse chip;
   wherein the voltage detection chip is configured to detect a charging voltage for charging the cell in real time, and to output a control signal for controlling the switch circuit to switch on when the charging voltage is too large, such that an overvoltage current is formed on a fuse between an output pin and a limit-voltage pin of the limit-voltage and limit-current fuse chip and the fuse is melted;
   wherein a fuse between an input pin and the output pin of the limit-voltage and limit-current fuse chip is also melted when the charging current is too large; and
   wherein the primary protection circuit acts on a low side of the charging and discharging interface and the secondary protection circuit acts on a high side of the charging and discharging interface.

2. The overvoltage and overcurrent protection circuit according to claim 1, wherein, the overvoltage and overcurrent protection circuit further comprises:
   a filtering circuit, comprising a high potential end and a low potential end; wherein, the high potential end is coupled to the low potential interface end of the primary protection circuit, and the low potential end is coupled to the high potential interface end of the secondary protection circuit;
   the filtering circuit is configured to perform a low-pass filtering on an electric signal inputted from the charging and discharging interface when the cell is charged via the charging and discharging interface.

3. The overvoltage and overcurrent protection circuit according to claim 1, wherein,
   the secondary protection circuit comprises a first resistor, a first capacitor, a second resistor, a second capacitor, a third resistor, a third capacitor, a voltage detection chip, a limit-voltage and limit-current fuse chip and a switch circuit;
   a first terminal of the first resistor, a second terminal of third resistor and a second fuse pin of the limit-voltage and limit-current fuse chip are respectively configured as the high potential cell end, the low potential cell end and the high potential interface end of the secondary protection circuit, a positive voltage detection pin, a negative voltage pin, a control output pin, a power pin and a delay pin of the voltage detection chip are respectively coupled to a second terminal of the first resistor, a first terminal of the first capacitor, a second terminal of the third resistor, a controlled terminal of the switch circuit, a first terminal of the third capacitor and a first terminal of the second capacitor, each of a second terminal of the first capacitor, a second terminal of the third capacitor and a second terminal of the second capacitor is coupled to a second terminal of the third resistor, a first terminal and a second terminal of the second resistor are respectively coupled to a first fuse pin of the limit-voltage and limit-current fuse chip and the first terminal of the third capacitor, a first terminal of the third resistor is coupled to a control end of the switch circuit, a high potential end and a low potential end of the switch circuit are respectively coupled to a limit-voltage pin of the limit-voltage and limit-current fuse chip and a second terminal of the third resistor.

4. The overvoltage and overcurrent protection circuit according to claim 3, wherein,
   the switch circuit comprises a NMOS transistor; and
   a drain electrode, a gate electrode and a source electrode of the NMOS transistor are respectively configured as the high potential end, the controlled end and the low potential end of the switch circuit.

5. The overvoltage and overcurrent protection circuit according to claim 1, wherein,
   the primary protection circuit comprises a fourth resistor, a fifth resistor, a sixth resistor, a fourth capacitor, a fifth capacitor, a sixth capacitor, an over-charging and over-discharging detecting chip, a third switch chip and a fourth switch chip, in which the over-charging and over-discharging detecting chip outputs a control signal to control the third switch chip and a fourth switch chip to switch off a charging loop or a discharging loop;
   a first terminal of the fourth resistor, a first terminal of the fifth resistor and a second terminal of the sixth resistor are respectively configured as the power end, the detection end and the low potential interface end of the primary protection circuit; a current detection pin, a power pin, a ground pin, a low potential pin, an over-charging pin and an over-discharging pin of the over-charging and over-discharging detecting chip are respectively coupled to a second terminal of the fourth resistor, a first terminal of the fourth capacitor, a first terminal of the fifth resistor, a first terminal of the sixth resistor, a first gate pin of the third switch chip and a second gate pin of the third switch chip, a second terminal of the fourth capacitor is coupled to a first terminal of the fifth resistor, a first source pin and a second source pin of the third switch chip are respectively grounded and coupled to a second terminal of the fifth resistor, a third gate pin, a fourth gate pin, a third source pin, and a fourth source pin of the fourth switch chip are respectively coupled to the first gate pin, the second gate pin, the first source pin, and the second source pin of the third switch chip, the fifth capacitor and the sixth capacitor coupled in series are coupled between the first source pin and the second source pin of the third switch chip, and a second terminal of the sixth resistor is grounded.

6. The overvoltage and overcurrent protection circuit according to claim 2, wherein,
the filtering circuit comprises a seventh capacitor and an eighth capacitor; and
a first terminal of the seventh capacitor and a second terminal of the eighth capacitor are respectively configured as the high potential end and the low potential end of the filtering circuit, and a second terminal of the seventh capacitor is coupled to a first terminal of the eighth capacitor.

7. The overvoltage and overcurrent protection circuit according to claim 1, wherein, the charging and discharging interface is a USB (Universal Serial Bus) interface.

8. The overvoltage and overcurrent protection circuit according to claim 7, wherein, a power end and a ground end of the USB interface can support current equal to or less than a preset current threshold.

9. The overvoltage and overcurrent protection circuit according to claim 8, wherein,
the power end of the USB interface comprises at least two power pins; and
the ground end of the USB interface comprises at least two ground pins,
wherein the USB interface is a modified USB interface having a second power pin and a second ground pin.

10. A mobile terminal, comprising a cell and a charging and discharging interface, wherein, the mobile terminal further comprises the overvoltage and overcurrent protection circuit, and the overvoltage and overcurrent protection circuit comprises:
a primary protection circuit, comprising a power end, a detection end, and a low potential interface end, wherein the power end is coupled to an anode of a cell, the detection end is coupled to a cathode of the cell, and the low potential interface end is coupled to a ground end of a charging and discharging interface; the primary protection circuit is configured to detect whether there is an over-charging when the cell is charged, and to switch off charging the cell via the charging and discharging interface if there is the over-charging; the primary protection circuit is further configured to detect whether there is an over-discharging when the cell is discharging, and switch off discharging of the cell via the charging and discharging interface if there is the over-discharging; and
a secondary protection circuit, comprising a high potential cell end, a low potential cell end, and a high potential interface end, wherein the high potential cell end is externally coupled to the anode of the cell, the low potential cell end is externally coupled to the cathode of the cell, and the high potential interface end is externally coupled to a power end of the charging and discharging interface; the secondary protection circuit is configured to perform an overvoltage protection and an overcurrent protection via a fuse when the cell is charged via the charging and discharging interface,
wherein the secondary protection circuit comprises a voltage detection chip, a switch circuit and a limit-voltage and limit-current fuse chip;
wherein the voltage detection chip is configured to detect a charging voltage for charging the cell in real time, and to output a control signal for controlling the switch circuit to switch on when the charging voltage is too large, such that an overvoltage current is formed on a fuse between an output pin and a limit-voltage pin of the limit-voltage and limit-current fuse chip and the fuse is melted;
wherein a fuse between an input pin and the output pin of the limit-voltage and limit-current fuse chip is also melted when the charging current is too large; and
wherein the primary protection circuit acts on a low side of the charging and discharging interface and the secondary protection circuit acts on a high side of the charging and discharging interface.

11. The mobile terminal according to claim 10, wherein, the overvoltage and overcurrent protection circuit further comprises:
a filtering circuit, comprising a high potential end and a low potential end; wherein, the high potential end is coupled to the low potential interface end of the primary protection circuit, and the low potential end is coupled to the high potential interface end of the secondary protection circuit; the filtering circuit is configured to perform a low-pass filtering on an electric signal inputted from the charging and discharging interface when the cell is charged via the charging and discharging interface.

12. The mobile terminal according to claim 10, wherein, the secondary protection circuit comprises a first resistor, a first capacitor, a second resistor, a second capacitor, a third resistor, a third capacitor, a voltage detection chip, a limit-voltage and limit-current fuse chip and a switch circuit;
a first terminal of the first resistor, a second terminal of third resistor and a second fuse pin of the limit-voltage and limit-current fuse chip are respectively configured as the high potential cell end, the low potential cell end and the high potential interface end of the secondary protection circuit, a positive voltage detection pin, a negative voltage pin, a control output pin, a power pin and a delay pin of the voltage detection chip are respectively coupled to a second terminal of the first resistor, a first terminal of the first capacitor, a second terminal of the third resistor, a controlled terminal of the switch circuit, a first terminal of the third capacitor and a first terminal of the second capacitor, each of a second terminal of the first capacitor, a second terminal of the third capacitor and a second terminal of the second capacitor is coupled to a second terminal of the third resistor, a first terminal and a second terminal of the second resistor are respectively coupled to a first fuse pin of the limit-voltage and limit-current fuse chip and the first terminal of the third capacitor, a first terminal of the third resistor is coupled to a control end of the switch circuit, a high potential end and a low potential end of the switch circuit are respectively coupled to a limit-voltage pin of the limit-voltage and limit-current fuse chip and a second terminal of the third resistor.

13. The mobile terminal according to claim 12, wherein, the switch circuit comprises a NMOS transistor; and
a drain electrode, a gate electrode and a source electrode of the NMOS transistor are respectively configured as the high potential end, the controlled end and the low potential end of the switch circuit.

14. The mobile terminal according to claim 10, wherein, the primary protection circuit comprises a fourth resistor, a fifth resistor, a sixth resistor, a fourth capacitor, a fifth capacitor, a sixth capacitor, an over-charging and over-discharging detecting chip, a third switch chip and a fourth switch chip, in which the third switch chip and a fourth switch chip are configured to receive a control signal from the over-charging and over-discharging detecting chip to switch off a charging loop or a discharging loop;

a first terminal of the fourth resistor, a first terminal of the fifth resistor and a second terminal of the sixth resistor are respectively configured as the power end, the detection end and the low potential interface end of the primary protection circuit; a current detection pin, a power pin, a ground pin, a low potential pin, an over-charging pin and an over-discharging pin of the over-charging and over-discharging detecting chip are respectively coupled to a second terminal of the fourth resistor, a first terminal of the fourth capacitor, a first terminal of the fifth resistor, a first terminal of the sixth resistor, a first gate pin of the third switch chip and a second gate pin of the third switch chip, a second terminal of the fourth capacitor is coupled to a first terminal of the fifth resistor, a first source pin and a second source pin of the third switch chip are respectively grounded and coupled to a second terminal of the fifth resistor, a third gate pin, a fourth gate pin, a third source pin, and a fourth source pin of the fourth switch chip are respectively coupled to the first gate pin, the second gate pin, the first source pin, and the second source pin of the third switch chip, the fifth capacitor and the sixth capacitor coupled in series are coupled between the first source pin and the second source pin of the third switch chip, and a second terminal of the sixth resistor is grounded.

15. The mobile terminal according to claim 11, wherein, the filtering circuit comprises a seventh capacitor and an eighth capacitor; and a first terminal of the seventh capacitor and a second terminal of the eighth capacitor are respectively configured as the high potential end and the low potential end of the filtering circuit, and a second terminal of the seventh capacitor is coupled to a first terminal of the eighth capacitor.

16. The mobile terminal according to claim 10, wherein, the charging and discharging interface is a USB (Universal Serial Bus) interface.

17. The mobile terminal according to claim 16, wherein, a power end and a ground end of the USB interface can support current equal to or less than a preset current threshold.

18. The mobile terminal according to claim 17, wherein, the power end of the USB interface comprises at least two power pins; and the ground end of the USB interface comprises at least two ground pins, wherein the USB interface is a modified USB interface having a second power pin and a second ground pin.

* * * * *